United States Patent [19]

Ryffel et al.

[11] 4,282,777
[45] Aug. 11, 1981

[54] PANCAKE PLANETARY DRIVE

[75] Inventors: Henry Ryffel, Nashua, N.H.; Thomas J. Black, Jr., Lowell, Mass.

[73] Assignee: Compudrive Corporation, North Billerica, Mass.

[21] Appl. No.: 555

[22] Filed: Jan. 2, 1979

[51] Int. Cl.³ .................... F16H 1/28; F04C 18/113
[52] U.S. Cl. ..................................... 74/804; 74/465; 418/61 B
[58] Field of Search ................... 74/804, 805, 465, 63, 74/415; 418/61 B

[56] References Cited

U.S. PATENT DOCUMENTS

| Re. 24,288 | 7/1954 | Nanni | 74/63 |
|---|---|---|---|
| 3,037,400 | 6/1962 | Sundt | 74/804 |
| 3,073,184 | 1/1963 | Braren | 74/411 X |
| 3,192,799 | 7/1965 | Pamplin | 74/805 |
| 3,846,051 | 11/1974 | McDermott | 418/61 B |
| 3,979,167 | 9/1976 | Grove | 418/61 B |
| 3,985,047 | 10/1976 | Therkelsen | 74/805 |
| 4,023,411 | 5/1977 | Osterwalder | 74/805 |

FOREIGN PATENT DOCUMENTS 542206 11/1929 Fed. Rep. of Germany ............ 74/805

Primary Examiner—Allan D. Herrmann
Attorney, Agent, or Firm—Cesari and McKenna

[57] ABSTRACT

A improved planetary drive employs a pair of radially inner and outer nonorbiting members between which is radially disposed an annular orbiting member. The inner nonorbiting member and the inner surface of the inner wall of the orbiting member are formed with opposing surface in meshing engagement to form one stage of a planetary drive, while the opposing surfaces of the outer nonorbiting member and the orbiting member are formed with teeth in meshing engagement to form a second stage of a planetary drive. All of the orbiting and nonorbiting members and their teeth lie in the same plane or planes disposed radially outward from the means for orbiting the orbiting member so that when that member is orbited, the forces exerted on the orbiting means are in said plane or planes. Various combinations of rollers and lobed surfaces to formed the gear stages are also described.

14 Claims, 7 Drawing Figures

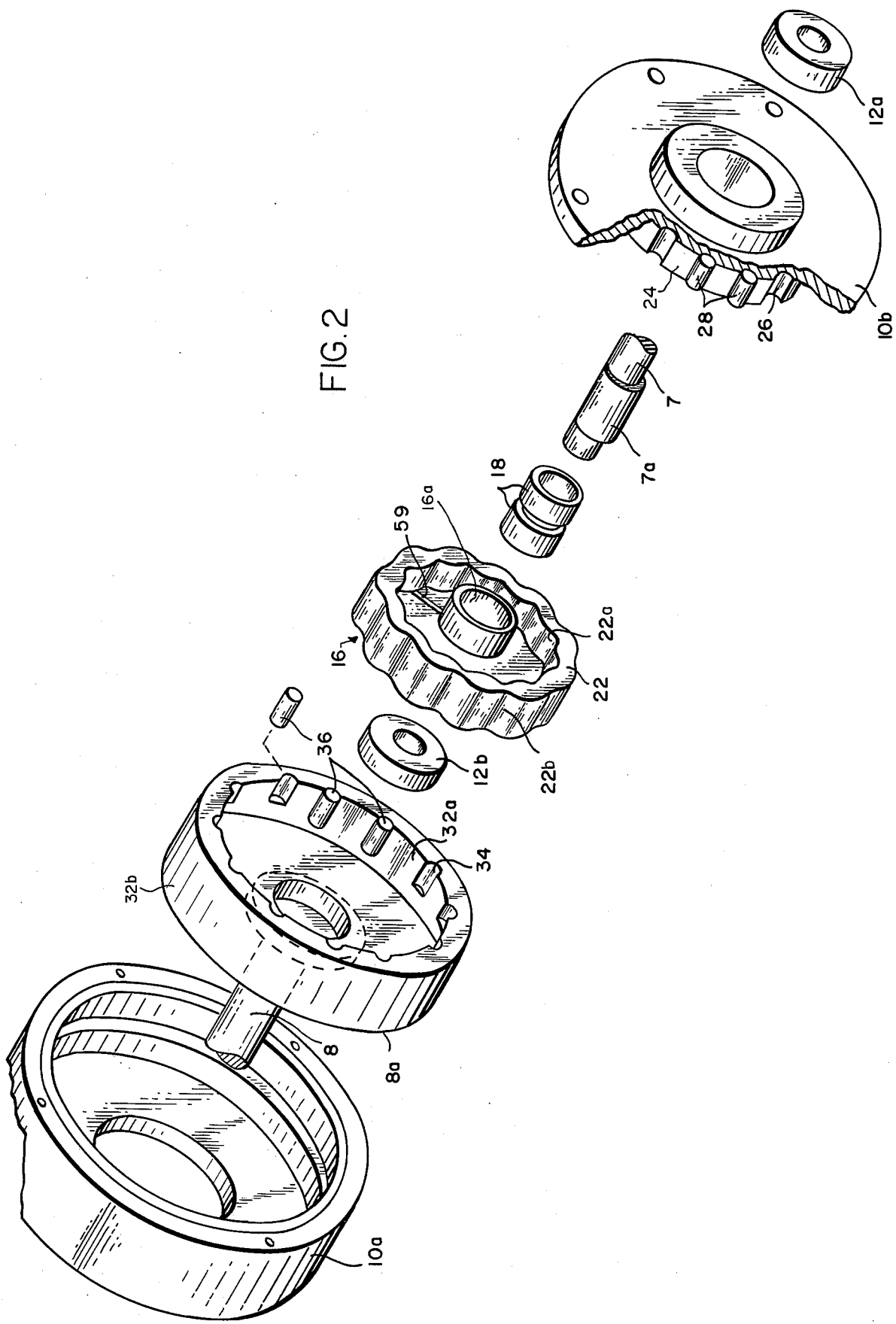

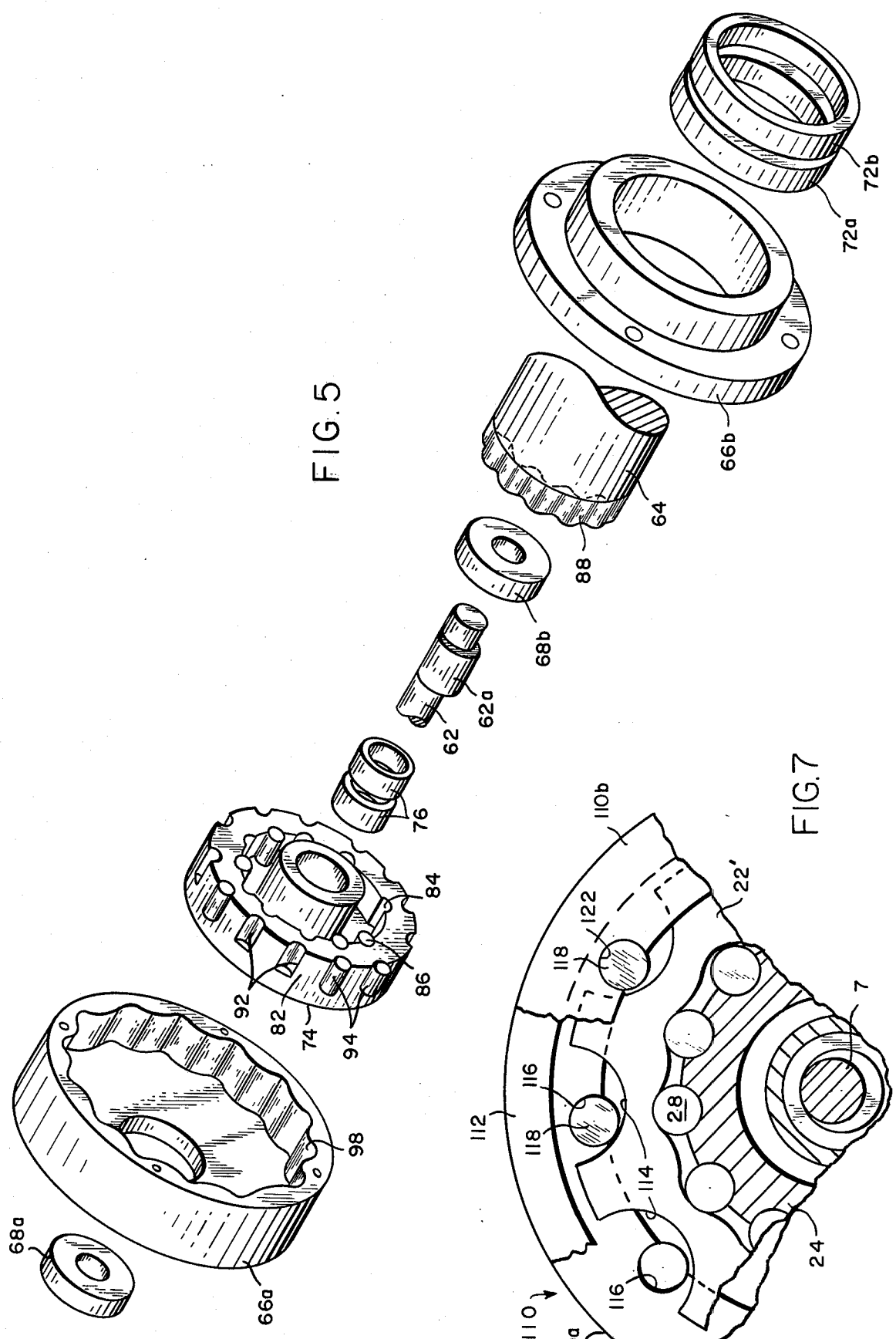

PANCAKE PLANETARY DRIVE

BACKGROUND OF THE INVENTION

This invention relates to a planetary drive. It relates more particularly to a particularly efficient drive of this type which can be contained within a relatively small package. Planetary drives have of course been available for many years. Many different drive designs have been proposed employing cooperating sets of side-by-side orbiting and nonorbiting gears. Examples of such transmissions are disclosed in the following patents:

U.S. Pat. No. Re. 24,288, Nanni
U.S. Pat. No. 3,056,315, Mros
U.S. Pat. No. 3,073,184, Braren
U.S. Pat. No. 3,192,799, Pamplin
U.S. Pat. No. 3,985,047, Therkelsen
U.S. Pat. No. 3,998,112, Pierrat
U.S. Pat. No. 4,023,440, Kennington
No. 542,206, Fed. Rep. of Germany Of particular relevance for purposes of this invention are U.S. Pat. Nos. 3,998,112 and 4,117,746, which are owned by the assignee of the present application.

Prior transmissions of this general type employ orbiting gears having teeth or lobes of epitrochoidal curvature which cooperate with surrounding external nonorbiting gears whose teeth are in the form of cylindrical pins or rollers and exceed by one the numbers of teeth in the mating internal orbiting gears. In those drives there are at least two orbiting and nonorbiting gear pairs.

Prior transmissions of that general type are disadvantaged in that the mating orbiting-nonorbiting gear pairs are located side by side so that the gear pairs occupy a relatively large amount of space so that a relatively long housing package is required.

More importantly, however, during operation of the prior transmissions of this type, the forces exerted on the same cam are in opposite directions so that they form a couple. Consequently, those forces tend to cock and skew the bearings required between the orbiting members and their eccentric subjecting them to an excessive amount of stress which accelerates their fatigue and failure.

Also in the prior transmissions, the shaft bearings rotatively supporting the input and output shafts projecting from the housing are relatively remote, being located at the ends of the housing. Consequently, it is relatively difficult to keep them properly lubricated.

Still further, when operating planetary drives of this type as gear pumps in the nature of a geroter pump, it is difficult to maintain the tolerances required to provide effective seals between the mating orbiting and nonorbiting gear surfaces. Consequently, the pumping efficiency of such drives used as pumps is not as high as might be desired.

Further, since the nonorbiting gears in many of the prior drives have teeth in the form of fixed circular arrays of pins, spaced radially outward from the gear axes, maintenance of sufficiently high tolerances between those pins and the bore or barrel through the orbiting gears is difficult to achieve. The result is that the prior units have a tolerance stack-up problem which renders their output motions not as smooth as might be desired. This is particularly so in the case of transmissions subjected to a heavy load which tends to deflect the orbiting gears to the opposite sides of the transmission housing to the extent that their nondriving lobes actually interfere with pins on the opposite sides of the nonorbiting gears.

Also the prior transmission employing pins as the nonorbiting gear teeth are not as efficient as might be claimed or wished. This is because the pins, being rotatably but peripherally restrained in their sockets, are insufficiently lubricated so that a considerable amount of sliding friction exists between the orbiting and nonorbiting gears. Of course, this also promotes excessive parts wear, and subsequently, increases in roughness of operation and noise, a reduced operating life and a general deterioration in efficiency.

SUMMARY OF THE INVENTION

Accordingly, it is an object of the present invention to provide a planetary drive which operates efficiently under a wide variety of load conditions.

Another object of the invention is to provide a planetary drive which generates a relatively smooth output motion.

A further object of the invention is to provide a drive of this type which can be contained in a relatively short compact package.

Another object of the invention is to provide a planetary drive of this general type which does not tend to skew or overstress the bearing between each orbiting gear and its eccentric.

A further object of the invention is to provide a planetary drive of this type whose gear surfaces and bearings can be kept adequately lubricated.

A further object of the invention is to provide such a planetary drive which is relatively easy to make.

Another object is to provide a drive of this type which can operate uninterruptedly for a prolonged period.

Still another object is to provide a planetary drive which is a highly efficient torque transmitter.

A further object of the invention is to provide modifications in the lobe surfaces of planetary gearing which will attenuate the efficiency-diminishing aspects of deflections under load which are not taken into consideration in prior similar drives.

Still another object of the invention is to provide a planetary drive whose bearings are less susceptible to racking.

Another object is to provide a planetary drive whose mating gear surfaces are easier to fabricate accurately.

A further object of the invention is to provide a planetary drive which can operate as a relatively efficient, high capacity fluid pump.

Other objects will in part be obvious and will in part appear hereinafter.

The invention accordingly comprises the features of construction, combination of elements and arrangement of parts which will be exemplified in the following detailed description, and the scope of the invention will be indicated in the claims.

In general, the planetary drive of this invention comprises a separable generally cylindrical housing in which two, in-line, rotatable first and second shafts are journalled. The first shaft is provided with an eccentric shoulder for supporting, via a bearing, an annular orbiting member. The radially inner surface of the orbiting member is provided with a first set of "teeth" which engage a cooperating set of "teeth" on a first nonorbiting member positioned radially inward from the annular orbiting member and fixed to rotate with the housing.

The radially outer surface of the annular orbiting member is provided with a second set of "teeth" which engage a cooperating set of "teeth" on a second nonorbiting member positioned radially outward from the orbiting member and fixed to rotate with the second shaft.

In one embodiment of the invention, the orbiting member comprises an annular body whose inner wall or surface follows a substantially continuous hypo-cycloidal curvature which curvature is preferably modified by cropping the crests of the lobes or teeth of that surface so that the crests are arcs of a single circle whose center coincides with the axis of that member. On the other hand, the outer surface of that orbital member follows a substantially continuous epitrochoidal curvature to form an outer set of lobes or teeth.

In that drive embodiment, the two nonorbiting members comprise inner and outer rings, each ring having a peripheral array of sockets in the form of circular arcs which rotatively receive a set of cylindrical pins or rollers with each roller being relatively loosely retained in and free to roll within its socket. The curved surfaces of the pins projecting out of the sockets constitute the teeth of the nonorbiting members. The number of sockets in the inner nonorbiting member is at least one less than the number of lobes on the inner surface of the orbiting member, while the number of sockets in the outer nonorbiting member is at least one more than the number of lobes on the outer surface of the orbiting member.

In the other drive embodiment, the so-called teeth on the orbiting and nonorbiting members are reversed. That is, the orbiting member comprises a ring having radially inner and outer walls or surfaces provided with inner and outer arrays of pin-containing sockets, the pins being freely rotatable within their sockets. One nonorbiting member positioned radially inward from the orbiting member has an outer wall or surface formed with a substantially continuous epitrochoidal curvature in mating contact with the inner array of pins on the orbiting member. The second nonorbiting member positioned radially outward from the orbiting member comprises an annulus having an inner wall or surface formed with a substantially continuous hypocycloidal curvature, also preferably modified as described above.

In this embodiment, the inner nonorbiting member is connected to the second shaft and the outer nonorbiting member is fixed to the housing so that in this drive embodiment, as in the first, the housing may be stationary. Here, the number of lobes on the inner nonorbiting member is at least one less than the number of sockets in the inner wall of the orbiting member, while the number of lobes on the outer nonorbiting member is at least one more than the number of sockets in the outer wall of the orbiting member.

In both drive embodiments, differential actions may be developed by rotating one of the two shafts relative to the housing or vice versa, the output torque being taken from the other shaft. Also, of course, one shaft can be rotated relative to the other, the output torque being taken from the housing. Since all of the orbiting and nonorbiting members, including the cooperating pins, are located in the same plane or planes, when the drive is under load the forces exerted against the driving eccentric are in opposite directions but in the same plane or planes. Consequently, substantially no off-axis or skewing forces are applied to the bearings between the orbiting member and its eccentric shoulder. Thus with less stress, their useful lifes are prolonged. Likewise the required shaft bearings being located closer to the centrally loaded eccentric are subject to less racking and stress. Additionally the drive is able to respond promptly to speed increases.

Moreover the fact that all of the mating gear surfaces are located in essentially the same plane or planes makes it much easier to maintain those surfaces properly lubricated. More particularly, as the orbiting member orbits, the volumes of the spaces between the opposing "teeth" of the orbiting and inner nonorbiting gears, on the one hand, and the spaces between the "teeth" of the orbiting and outer nonorbiting member on the other are changing constantly and are changing one relative to the other in a reciprocal fashion. Accordingly, lubricant is constantly pumped back and forth between those spaces.

Further, as the drive operates the rollers are constantly rotated in their respective sockets so that lubricant is drawn in under the rollers. Consequently they are kept well lubricated and a squeeze film is maintained between the relatively large-area contacting surfaces of each pin and its socket so that the stresses on the socket walls and parts wear are kept to a minimum and efficiency is maximized. Furthermore, the squeeze film functions as a shock absorber which tends to compensate for such play that may exist between orbiting and nonorbiting member pairs. Thus, very close tolerances do not have to be maintained all the way from the outer nonorbiting member to the bore or barrel of the orbital member thus avoiding a tolerance stack-up problem. Yet the output motion of the drive is smoother than those of prior comparable orbital drives of this general type. Even greater efficiency results if fluid pressure at the ends of the pins is relieved by appropriate channeling of lubricant as will be described in detail later.

The subject drive, particularly the second mentioned embodiment thereof, makes a particularly efficient gear type pump in the nature of a geroter pump because compressive loading can be utilized to maintain particularly effective rolling seals between the outer wall "teeth" of the orbiting member and the gently curved lobes of the large radius outer or nonorbiting member. In this application, suitable input and output porting is provided in the outer member. Since the outer member is on a larger radius and greater eccentricity can be utilized to drive the orbiting member the pump has maximum displacement and, therefore, pumping capacity.

As a result of the aforesaid features, the present drive can be manufactured and assembled at a relatively low cost as compared to prior comparable apparatus of this general type. Still however, it should operate efficiently and reliably for a prolonged period so that maintenance and down time costs are also minimized.

BRIEF DESCRIPTION OF THE DRAWINGS

For a fuller understanding of the nature and objects of the invention, reference should be had to the following detailed description taken in connection with the accompanying drawings, in which:

FIG. 2 is an exploded perspective view with parts cut away showing the various components of the FIG. 1 drive in greater detail;

FIG. 5 is a view similar to FIG. 2 of the FIG. 4 embodiment;

FIG. 7 is a fragmentary sectional view with parts cut away illustrating another drive variation.

DESCRIPTION OF THE PREFERRED EMBODIMENTS

Figure 3:
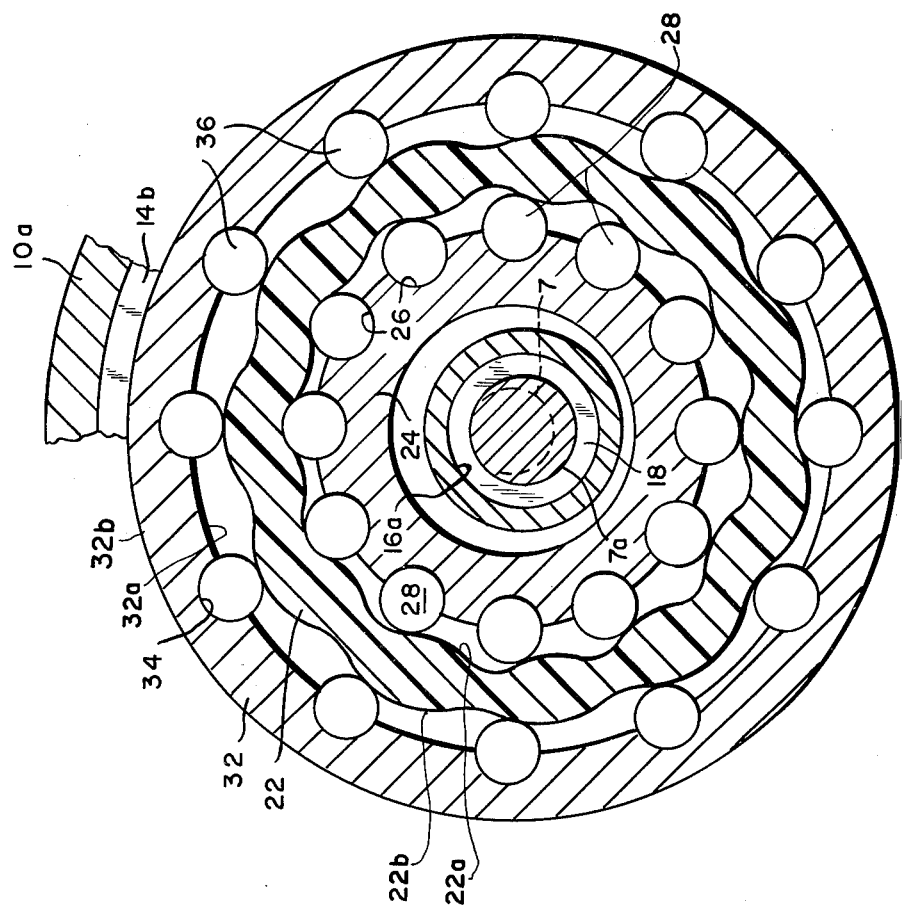
FIG. 3 is a sectional view along line 3—3 of FIG. 1.
Figure 1:
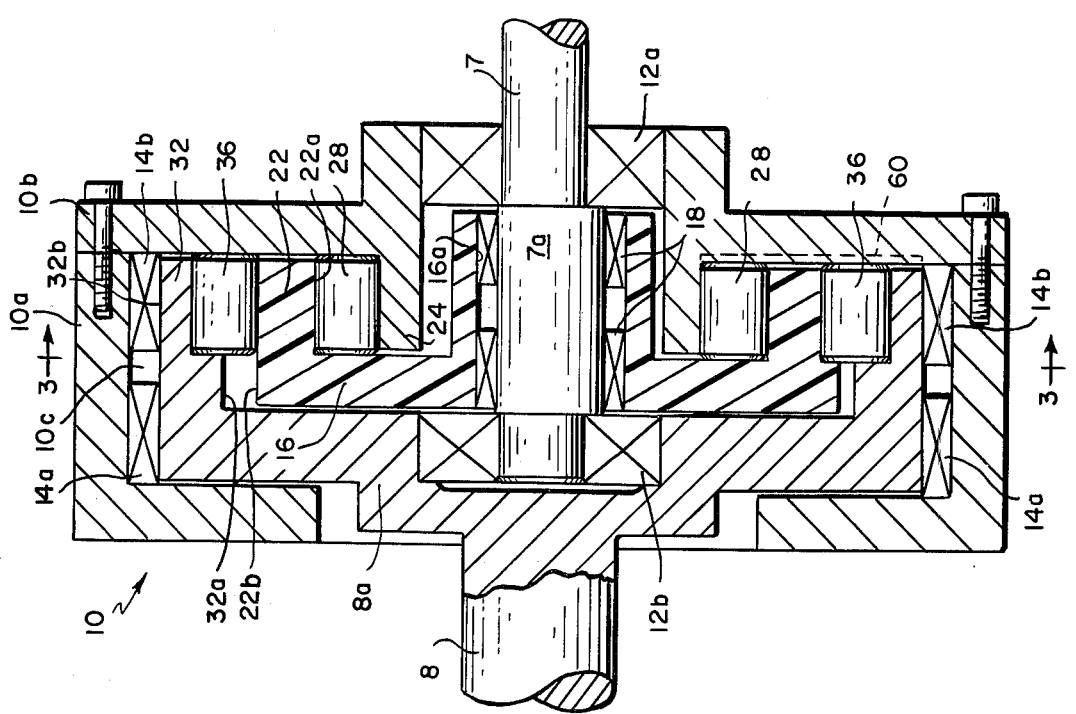
FIG. 1 is a cross-sectional view of a planetary drive embodying the principles of this invention.

Referring to FIGS. 1 to 3 of the drawings, an improved planetary drive comprises first and second shafts 7 and 8 rotatively supported collinearly within a housing 10. Housing 10 comprises separable housing parts 10a and 10b which are normally held together by suitable fasteners (not shown). Shaft 7 is rotatively supported within the housing by a bearing 12a positioned between shaft 7 and the housing part 10b. The end of the shaft within the housing is rotatively supported by a second bearing 12b disposed within the inner end of shaft 8. Shaft 8 is formed integrally with a plate 8a which extends radially outward within housing cavity 10c. Annular sets of bearings 14a and 14b extend around the housing cavity 10c between plate 8a and the outer curved wall of housing part 10a to provide bearing support for shaft 8.

Positioned within cavity 10c is an orbiting member 16 having an axial barrel or bore 16a which is rotatively received on an eccentric shoulder 7a on shaft 7, there being suitable bearing means 18 provided between barrel 16a and the eccentric shoulder. These may be needle bearings for example. Formed at the periphery of the orbiting member 16 is an annular flange 22 having a radially inner surface or wall 22a and a radially outer wall 22b. The inner wall 22a is located directly opposite an annular flange 24 formed in housing part 10b containing semicylindrical sockets 26. Rotatively seated in each socket is a cylindrical pin or roller 28, the opposing surfaces of each pin and its socket wall having a relatively large area and all of said pins being able to rotate freely within their respective sockets. Preferably for some applications the rollers are uncaptured peripherally, i.e. the roller diameter is less than the width of the socket mouth.

Formed at the periphery of the plate 8a is a similar annular flange 32 having a radially inner wall or surface 32a and a radially outer wall 32b which is supported by the bearing 14b between that wall and the outer wall of part 10a. The inner wall 32a, on the other hand, is formed with a circumferential array of semicylindrical sockets 34 in which are rotatively seated a second set of pins or rollers 36, the sockets 34 and pins 36 being substantially the same size as sockets 26 and pins 28.

Still referring to FIGS. 1 to 3, the inner wall 22a of the orbiting member 22 follows a substantially continuous modified hypo-cycloidal curvature with the pins 28 being in continuous rolling contact with that wall so that the orbiting member wall 22a and the pin-supporting flange 24 constitute a first orbiting-nonorbiting member pair. As with other planetary gearing of this general type, the number of sockets 26 in the nonorbiting member 24 is one less than the number of lobes in the orbiting member wall 22a.

The outer wall 22b of the orbiting member, on the other hand, is formed with an epitrochoidal curvature with the pins 36 on the outer nonorbiting flange member 32 being in substantially continuous rolling contact with that outer wall. Thus the orbiting member outer wall 22b and the pin-supporting flange 32 constitute a second orbiting-nonorbiting member pair.

As best seen in FIG. 1, the structure comprising the two orbiting-nonorbiting member pairs including the pins 28 and 36 are all located in substantially the same plane or planes directly radially outboard from the bearing means 18 between the orbiting member 22 and the eccentric shoulder 7a. Consequently, when the member 22 is orbited such as by rotating shaft 7 relative to housing 10, the forces exerted on shoulder 7a are in the same plane or planes. Therefore, the bearing means 18 between shoulder 7a and the orbiting member is centrally loaded so that means 18 is not racked or skewed as member 22 orbits. Resultantly the stresses imposed upon bearing means 18 are kept relatively low. Preferably also the bearing means 18 is subjected to compressive loading during assembly of the drive members to eliminate any radial clearance in the bearing means that may exist. Likewise, the shaft bearings 12a and 12b and 14a and 14b, being located very close to the plane or planes containing the pins 28 and 36 and right adjacent the eccentric shoulder 7a also suffer a minimum amount of stress due to off-axis or racking forces applied to those bearing parts.

The utilization in the present drive of free rollers 28 and 36 instead of captured ones as in prior drives of this general type also increases the efficiency and load capacity of the apparatus considerably and further smoothens its output motion. This is because the rollers are free to rotate in their sockets so that lubricant present in housing 10 is constantly drawn underneath the rollers. Resultantly the rollers are kept lubricated and so-called squeeze films of lubricant are maintained between the rollers and their sockets which function as shock absorbers and tend to smoothen the output motion of the drive and obviate the need to maintain close tolerances from the outer nonorbiting member 32 all the way into the barrel 16a.

Actually if hollow sleeves instead of pins are used, even lower tolerances can be maintained. This is because the sleeves can be placed under radial compression so that they actually deform under load and conform to their sockets to achieve efficient rolling contact with the inner and outer surfaces of the orbiting member 22 so long as the squeeze-film is maintained between the sleeves and their sockets. Utilization of sleeves instead of pins also permits lubricant present in the housing 10 to fill the spaces inside the sleeves during operation of the drive. This can provide significant noise attenuation in those applications where minimum noise is desirable.

Especially efficient and complete lubrication of contacting parts is achieved in the present drive because as the orbiting member 22 orbits, the volumes of the spaces between that member and the inner and outer nonorbiting members 24 and 32 including their pins are constantly changing in a reciprocal manner so that lubricant is circulated or pumped back and forth between those spaces so that fresh lubricant is always available to coat the surfaces of the rollers 28 and 36 and the walls of their respective sockets.

Preferably, the lubricant used in the present drive should be of tractive type which, when maintained under pressure, has a high coefficient of traction. A suitable lubricant of this type is sold by Monsanto Chemical Co., under the name Santotrac. This elastohydrodynamic lubricant has a greater tendancy than conventional ones to remain as an effective film or coating on the pins and member surfaces especially when they are actually performing a driving function and subjected to high stress. That type lubricant is especially desirable for use in planetary transmissions of this general type for other reasons set forth in co-pending application entitled Improved Planetary Transmission, Ser. No. 974,310, filed on Dec. 28, 1978 and owned by the assignee of the present application.

We have also found that there is a marked increase in the efficiency of the present drive if one or more radial grooves are provided in the surfaces opposite the ends of the pins 28 and 36. Apparently, when the drive is under load, the pins are driven end-wise tightly against those opposing surfaces members so that suction is created due to the lubricant film between those pin and member surfaces causing drag. The inclusion of the radial grooves in those members, as is shown at 59 on member 16 (FIG. 2) and at 60 on housing part 10*b* (FIG. 1), permits the lubricant to circulate and thus breaks the suction between the pin and member surfaces.

Figure 6:
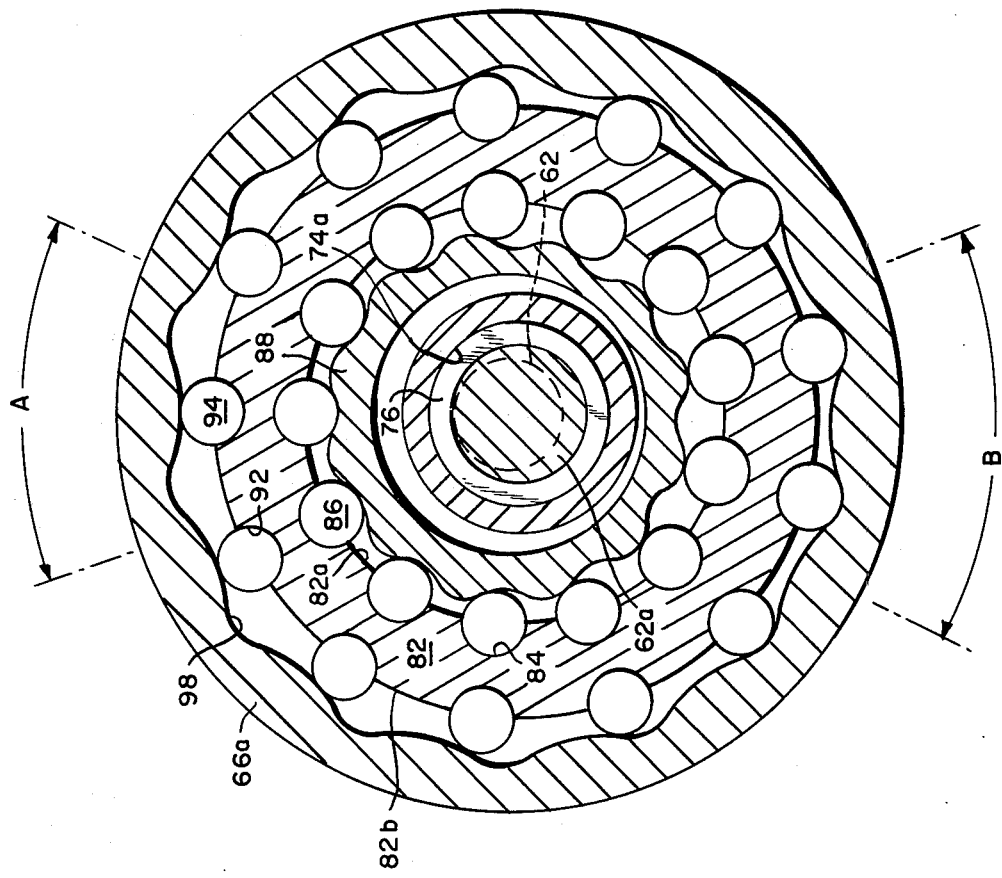
FIG. 6 is a view along line 6—6 of FIG. 4.
Figure 4:
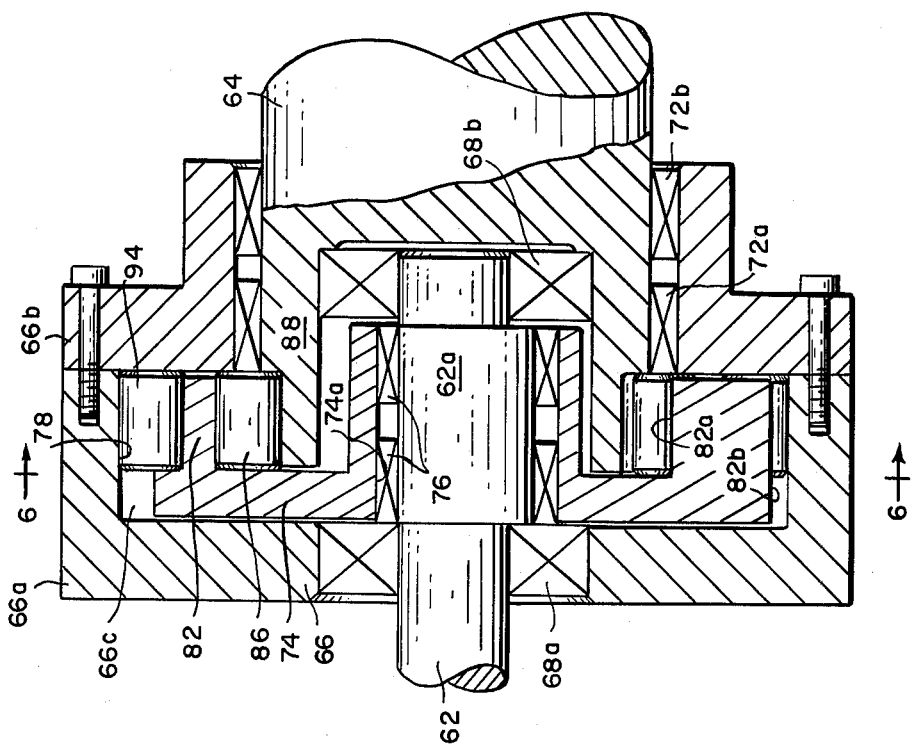
FIG. 4 is a view similar to FIG. 1 of another planetary drive embodiment.

Referring now to FIGS. 4 to 6 of the drawings, in a second embodiment of our drive, the shapes of the orbiting and nonorbiting members are reversed. More particularly in this embodiment, the orbiting member carries inner and outer peripheral arrays of pins while the radially inner and outer nonorbiting members are lobed. This embodiment includes first and second shafts 62 and 64 rotatively supported colinearly within a housing 66. Housing 66 comprises a first housing section 66*a* and a second flanged housing section 66*b*, the sections being normally held together by suitable means (not shown) forming a cavity 66*c*. Shaft 62 is rotatively supported within the housing by bearing 68*a* positioned between shafts 62 and housing part 66*a*. The end of shaft 62 within the housing cavity 66*c* is rotatively supported by a second bearing 68*b* positioned within the recessed end of the second shaft 64. Shaft 64, on the other hand, is rotatively supported within the housing by bearings 72*a* and 72*b* positioned between shaft 64 and the flanged housing section 66*b*.

Positioned within the housing is an orbiting member 74 having an axial barrel or bore 74*a* which is rotatively received on an eccentric shoulder 62*a* carried on shaft 62. Suitable bearing means 76 is positioned between barrel 74*a* and the eccentric shoulder 62*a*. Formed at the periphery of orbiting member 74 is an annular flange 82 having a radially inner wall or surface 82*a* and a radially outer wall or surface 82*b*. Wall 82*a* is formed with a circular array of sockets 84 which rotatively receive a corresponding array of pins or rollers 86, each pin being able to rotate freely within its respective socket.

The inner wall 82*a* of the orbiting member is located directly opposite the end of shaft 64 inside the housing which is shaped to constitute a nonorbiting member 88. The member surface 88 is formed with an epitrochoidal curvature in meshing engagement with the inner array of pins on the orbiting member 74 has best seen in FIG. 6. Member 88 has at least one less lobe than there are sockets 84.

A second circular array of sockets 92 is formed in the outer wall 82*b* of the orbiting member for rotatively receiving a second array of pins or rollers 94. These pins are in meshing engagement with the inside circular wall of housing section 66*a* which is shaped to constitute a second internal nonorbiting member 98 of modified-hypocycloidal curvature, there being at least one more lobe in member 98 than sockets 92.

As with the FIG. 1 drive embodiment, the orbiting and nonorbiting members of the FIGS. 4 to 6 drive are all positioned in more or less the same plane or planes radially outward from the eccentric shoulder 66*a* with its bearing means 76. Consequently, this embodiment has all of the advantages of the one described previously in terms of complete and efficient lubrication of all contacting parts and efficient operation under load. This embodiment has one advantage over the FIG. 1 drive in that it is somewhat easier to fabricate because the nonorbiting gear 98, being on a relatively large radius, has a smooth and gentle curve which is easier to inscribe.

Indeed that feature enables this drive embodiment to function as a particularly efficient pump in the nature of a geroter pump. In other words, because of the gentle curvature of the outer nonorbiting member 98, when the pins 94 are placed under radial compression an especially effective seal is maintained between the surfaces of the pins 94 and the nonorbiting member 98. Consequently if an intake port is formed in housing section 66*a* covering a selected sector of the housing cavity 66*c* as indicated at A in FIG. 6 and an outlet port provided in that housing section at an opposite sector B illustrated in that figure, the operation of the FIG. 6 drive will result in fluid being drawn in through port A and expelled through port B. Because of the relatively large diameter of the nonorbiting member 98, the eccentric shoulder 62*a* can be made quite large so that the pump displacement is commensurably large. Thus the drive used as a pump will have a relatively large capacity.

It will thus be seen from the foregoing that our drive provides significant advantages over prior two stage planetary drives whose stages are situated side-by-side, in terms of improved efficiency, reduced parts wear, and longer life expectancy. Yet the present drive should cost no more to manufacture than prior apparatus of this general type.

It will also be seen that the objects set forth above, among those made apparent from the preceding description, are efficiently attained. Also certain changes may be made in the above constructions without departing from the scope of the invention. For example, it is possible to utilize one stage of the subject drive with the so-called zero velocity transmission plate described in U.S. Pat. No. 4,117,746. Thus in FIG. 3, the outer wall of orbiting member 22 can be formed with a peripheral array of oversized recesses like those in FIG. 3 of that patent (whose diameter equals the pin diameter plus twice the eccentricity). The number of such recesses corresponds to the number of pins 36 in nonorbiting member 32 so that member can orbit, but not rotate relative to member 32 and hence output shaft 8.

It should be noted that the pins coacting with the transmission plate recesses can, if desired, be supported at both ends to avoid stresses due to cantilevering. FIG. 7 shows an arrangement of that type. That embodiment is similar to the one in FIGS. 1 to 3 except that transmission plate recesses are substituted for the outer lobed surfaces of the orbiting member as just described. In this arrangement, however, the outer annular nonorbiting member 110 is composed of two halves 110*a* and 110*b* separated by an annular spacer 112 extending around the outer edge margins of the member halves. An orbiting member 22′ is positioned in the space between the two halves. Member 22′ is similar to member 22 in the FIGS. 1 to 3 drive except that its outer wall has recesses 114 instead of lobes. All parts radially inboard of member 22' are the same as in the FIGS. 1 to 3 drive.

During assembly, the member 22' is sandwiched between member halves 110a and 110b and the two members and intervening spacer 112 are secured together by fasteners or other suitable means (not shown). At least one member half 110a or 110b is provided with a circular array of pin receiving openings 116 such as shown in member half 110a opposite the locations of recesses 114 in member 22'. The other member half has a registering array of similar openings 116 or simply internal circular recesses for receiving and capturing the ends of pins 118 inserted into openings 116 and through recesses 114. Also, if desired, for the reasons discussed above, the pins 118 may be captured in sockets such as shown at 122 in member half 110b. Sockets 122 should engage at least half the pin circumference. The pins are held in place axially by a housing section such as section 10b (FIG. 1).

This same arrangement can be used in the transmission described in the above patent. The only modification is that the lobed orbiting member attached to the transmission plate in that apparatus has to be extended in length by the thickness of a member half 110a so that its lobed surface can be engaged by the pins of the other nonorbiting member. Alternatively, a spacer of that thickness may be inserted between the transmission plate and the other orbiting member.

Accordingly, it is intended that all matter contained in the above description or shown in the accompanying drawings be interpreted as illustrative and not in a limiting sense.

It is also to be understood that the following claims are intended to cover all of the generic and specific features of the invention herein described.

What is claimed as new and desired to be secured by Letters Patent of the United States is:

1. An improved two stage planetary differential drive comprising:
   A. a housing,
   B. an inner nonorbiting member in the housing,
   C. an outer nonorbiting member in the housing, one of said nonorbiting members being rotatively fixed to the housing, the other nonorbiting member being rotatively movable in the housing,
   D. a shaft connected to the other nonorbiting member and projecting from said housing,
   E. an annular orbiting member positioned in the housing radially between the inner and outer nonorbiting members, said orbiting member having an inner wall and an outer wall surrounding the inner wall, said inner nonorbiting member and the inner wall of said orbiting member being formed with opposing surfaces constituting teeth in meshing engagement with one another, there being at least one less tooth in the inner nonorbiting member than in the orbiting member inner wall, said outer nonorbiting member and the outer wall of said annular orbiting member being formed with opposing surfaces constituting teeth in meshing engagement with one another, there being at least one more tooth in the outer nonorbiting member than in the orbiting member outer wall, and
   F. means for orbiting the orbiting member about said shaft axis, all of said orbiting and nonorbiting member teeth being disposed radially outward from and in the same transverse section of the drive as said orbiting means so that when said orbiting member is orbited, the forces exerted on said orbiting means are all in said section.

2. The drive defined in claim 1 and further including bearing means positioned radially between said orbiting means and said orbiting member.

3. The drive defined in claim 1 wherein
   A. the meshing teeth of the inner nonorbiting member comprise a circular array of cylindrical rollers rotatively received in a peripheral array of semi-cylindrical sockets in the inner nonorbiting member so that curved surfaces of said rollers project out of the sockets,
   B. the teeth on the inner wall of the annular orbiting member comprise lobes of a surface of hypo-cycloidal curvature in substantially continuous rolling contact with said roller array when said orbiting member is orbited,
   C. the teeth on the outer nonorbiting member comprise a second circular array of cylindrical rollers rotatively received in a circumferential array of semi-cylindrical sockets in the outer nonorbiting member so that curved surfaces of said rollers project out of said socket, and
   D. the teeth on the outer wall of said annular orbital member comprise lobes of a surface of epitrochoidal curvature in substantially continuous rolling contact with said second roller array when said orbiting member is orbited.

4. The drive defined in claim 1 wherein:
   A. the teeth of the inner nonorbiting member comprise lobes of a surface of epitrochoidal curvature,
   B. the teeth on the inner wall of said annular orbiting member comprise a circular array of cylindrical rollers rotatively received in a circumferential array of semi-cylindrical sockets in the orbital member inner wall said sockets having their curved surfaces projecting from said sockets,
   C. the teeth of the outer nonorbiting member comprise lobes of a surface of hypo-cycloidal curvature, and
   D. the teeth on the annular orbiting member outer wall comprise a second circular array of cylindrical rollers rotatively received in a circumferential array of semi-cylindrical sockets in the orbiting member outer wall, the curved surfaces of said pins in the second array projecting from their sockets, said first and second pin arrays and their opposing lobed surfaces being in substantially continuous rolling contact with one another when said orbiting member is orbited.

5. The drive defined in claim 3 or 4 and further including fluid lubricant in said housing said lubricant being drawn into the spaces between the walls of said sockets and the rollers in rolling contact with said lobed surfaces so as to maintain squeeze films between said roller and said socket walls.

6. The drive defined in claim 5 wherein said rollers comprise hollow sleeves.

7. The drive defined in claim 5 wherein said lubricant is a tractive type lubricant whereby said rollers are rotated freely within their sockets without accompanying slippage between said rollers and the lobed surfaces which they engage.

8. The transmission defined in claim 3 or 4 wherein the depth of said sockets is less than the radius of said rollers.

9. The drive defined in claim 3 or 4 and further including means for breaking any suction arising between the ends of said rollers and their opposing surfaces when said orbiting member is orbited.

10. The drive defined in claim 1 and further including:
   A. means defining a fluid intake passage in said outer nonorbiting member encompassing a first selected sector of said member, and
   B. means defining an outlet passage in said outer nonorbiting member, said outlet passage encompassing a second selected sector of said outer member said second sector being disposed substantially opposite said first sector whereby as said orbiting member is orbited, a negative pressure is created at said intake passage and a positive pressure is created at said outlet passage.

11. The drive defined in claim 1 wherein the orbiting member comprises an annular cup-shaped member having
   A. an axially extending outer flange which defines said inner and outer walls of the orbiting member,
   B. an axially extending inner flange protruding between the inner nonorbiting member and the orbiting means so as to rotatively receive the orbiting means.

12. The drive defined in claim 11
   A. wherein the orbiting means comprises an eccentric cam, and
   B. further including bearing means positioned between said inner flange and said cam.

13. The drive defined in claim 11 wherein the outer nonorbiting member comprises a cup-shaped member having an axially extending outer flange within which the orbiting cup-shaped member nests.

14. The drive defined in claim 13 and further including bearing means positioned between the outer nonorbiting member flange and the housing around the perimeter of that flange.

* * * * *